(12) United States Patent
Ito et al.

(10) Patent No.: US 6,551,411 B1
(45) Date of Patent: Apr. 22, 2003

(54) DETERGENT COMPOSITION

(75) Inventors: Mikihiko Ito, Yokohama (JP); Noriko Yamauchi, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/914,634

(22) PCT Filed: Mar. 21, 2000

(86) PCT No.: PCT/JP00/01713

§ 371 (c)(1),
(2), (4) Date: Aug. 30, 2001

(87) PCT Pub. No.: WO00/56514

PCT Pub. Date: Sep. 28, 2000

(30) Foreign Application Priority Data

| Mar. 24, 1999 | (JP) | 11-078939 |
| Sep. 1, 1999 | (JP) | 11-246940 |
| Nov. 22, 1999 | (JP) | 11-331332 |

(51) Int. Cl.$^7$ ............... B29C 33/72; B29C 45/17; B29C 47/08
(52) U.S. Cl. ............... 134/9; 134/22.14; 134/22.16; 134/22.19; 134/39; 134/42; 510/188; 510/245; 510/362; 510/400; 510/466; 510/475; 510/511
(58) Field of Search ............... 510/188, 245, 510/362, 400, 466, 475, 511; 134/9, 22.14, 22.16, 22.19, 39, 42

(56) References Cited

U.S. PATENT DOCUMENTS

| 4,838,945 A | 6/1989 | Fujii et al. ............... 134/7 |
| 5,124,383 A | 6/1992 | Obama et al. ............ 524/115 |
| 5,236,514 A | 8/1993 | Leung et al. ........... 134/22.14 |
| 5,298,078 A * | 3/1994 | Itoh et al. ................... 134/9 |

FOREIGN PATENT DOCUMENTS

| JP | 2308900 A | 12/1990 | ........... C11D/7/60 |
| JP | 5-69446 A * | 3/1993 | ........... B29C/33/72 |
| JP | 5069446 A | 3/1993 | ........... B29C/33/72 |
| JP | 8155969 A | 6/1996 | ........... B29C/33/72 |
| JP | 11181486 A | 7/1999 | ........... C11D/7/22 |

* cited by examiner

*Primary Examiner*—Mark Kopec
*Assistant Examiner*—Brian P. Mruk
(74) *Attorney, Agent, or Firm*—Pennie & Edmonds LLP

(57) ABSTRACT

A detergent composition useful for cleaning away a resin remaining in a molding machine after molding, comprising a thermoplastic resin, water and wollastonite.

16 Claims, No Drawings

DETERGENT COMPOSITION

TECHNICAL FIELD

The present invention relates to a detergent for removing a resin itself as well as additives such as colorant contained therein which remain in a molding machine used for injection molding or extrusion molding of a thermoplastic resin (which may hereinafter be referred to simply as "resin") after completion of process such as coloring, mixing or molding of the resin.

BACKGROUND ART

Generally, an extrusion molding machine or an injection molding machine is used for conducting such processes as coloring, mixing or molding of a resin. Upon completion of these processes, there remain in the molding machine the resin itself and the additives such as colorant contained therein. If a same molding machine is used successively for molding the resins of different types or different colors, the residues of the previous operations stay as contaminants in the molded product to impair its visual appearance.

For removing these residues from the molding machine, several methods have been proposed and practically used, including a method comprising manually taking-apart and cleaning of the molding machine, a method in which the molding machine is kept running and filled with a molding material to be used next after the end of every round of operations so as to gradually replace the residue, and a method comprising use of a detergent.

When a molding machine, after use, is cleaned with a detergent and before the next round of molding operation, it is common practice to displace the residual detergent with the next supply of molding material. Therefore, the detergent used for this purpose is required to meet both the requirement to show a high detergency for the molding material used in the preceding molding operation and the requirement to be easily and effectively displaceable by the molding material used for the next molding operation.

Also, since various types of resin are often treated by a same molding machine in the molding operations, the detergent used for such a molding machine needs to be capable of showing a high detergency as well as easy displaceability for such various types of resin.

The conventional detergents, however, have been mostly designed for high detergency alone, and therefore the development of a detergent having not only high detergency but also easy removability (displaceability) has been desired.

Some of the present inventors had previously proposed a detergent comprising a styrene-based resin and a specific graft polymer as a preparation having excellent detergency combined with easy displaceability, and they also proposed to contain a specified amount of water or to contain glass fiber or glass particles in the detergent to enhance its detergency (U.S. Pat. No. 5,298,078). However, inclusion of glass fiber or glass particles in the detergent has problems that such inclusion could damage the interior of the molding machine when cleaned or clog the filter portion of the molding machine, and that it is necessary to take appropriate measures to prevent adverse effects to the working environment such as stimulation to the worker's skin.

Some of the present inventors had also proposed a detergent comprising a thermoplastic resin and a thermoplastic ultra-high-molecular-weight polymer as a product with excellent detergency and easy displaceability (JP-A 8-155969). In this detergent, however, if compatibility between the thermoplastic resin and the thermoplastic ultra-high-molecular-weight polymer is poor, part of the thermoplastic ultra-high-molecular-weight polymer might separate away and stay as powder in the detergent. In such a case, when the detergent is supplied to the hopper of a molding machine, the ultra-high-molecular-weight polymer powder would adhere to the hopper and mix in the molding material charged into the hopper after cleaning, thus necessitating much time for displacing the residual detergent.

U.S. Pat. No. 5,236,514 discloses a detergent comprising a thermoplastic resin and a higher fatty acid metal salt, and especially proposes a cleaning resin composition containing this detergent and an abrasive material selected from diatomaceous earth, ceramic particles, aluminum oxide, calcium carbonate, titanium dioxide, silica, minerals such as kaolin, mica, wollastonite, and the like. This cleaning resin composition is described as being capable of efficiently cleaning away a fluoroelastomer remaining in an extruder used for the molding operations. In this composition, however, diatomaceous earth is actually used as the abrasive material, so that when this composition is used as a detergent, it is unable to show a satisfactory detergency especially when it is used for removing general-purpose resins such as styrene- or olefin-based resins or engineering resins such as polycarbonate or polyphenylene resins. This composition is also unsatisfactory in displace-ability.

U.S. Pat. Nos. 4,838,945 and 5,124,383 disclose the cleaning resin compositions comprising an inorganic compound such as powdery calcium silicate having a specific particle size and a water-repellent compound such as silicone, but these compositions still fall short of the satisfactory level of detergency and displaceability.

DISCLOSURE OF THE INVENTION

The present invention is addressed to the solution of the above outstanding problems in the art of detergents. That is, the present invention is intended to provide a detergent composition which, without using glass fiber or glass particles, is capable of effectively cleaning away a resin remaining in a molding machine after a molding operation and also shows high detergency and easy displaceability for the residues of various types of resins such as general-purpose resins and engineering resins.

As a result of intensive studies for solving the above problems, the present inventors found that the detergency and displaceability of a detergent can be remarkably improved in comparison with the conventional detergents by using a thermoplastic resin containing wollastonite and water, and this finding led to the attainment of the present invention.

Thus, the present invention provides a detergent composition effective for cleaning away a residual resin in a molding machine after a molding operation, said composition comprising a thermoplastic resin, water and wollastonite.

BEST MODE FOR CARRYING OUT THE INVENTION

The present invention will be described in detail below.

The detergent composition of the present invention is characterized by containing a thermoplastic resin, water and wollastonite.

In the present invention, it is possible to use a wide variety of thermoplastic resins commonly used for injection molding or extrusion molding, and these resins can be used either alone or as a combination. Examples of the thermoplastic resins usable in this invention include styrene-based resins such as polystyrene, ethylene-based resins such as polyethylene, propylene-based resins such as polypropylene, methyl methacrylate-based resins such as polymethyl methacrylate, polyvinyl chloride, polyamide-based resins, polycarbonate, polybutene and the like. Of these resins, styrene-based resins are preferred.

The "styrene-based resins" refer to polystyrene and copolymers of styrene and one or more other monomers, of which the styrene content is 50% by weight or more. As the "other monomers" to be copolymerized with styrene, there can be used, for instance, acrylonitrile and butadiene. Examples of such styrene-based resins include polystyrene, styrene-acrylonitrile copolymer, styrene-butadiene-acrylonitrile copolymer and the like. It is especially preferred to use a styrene-acrylonitrile copolymer, particularly the one of which the acrylonitrile content is 5% or more by weight and less than 50% by weight, because of high detergency and reduced tendency to remain in the molding machine.

The molecular weight of the thermoplastic resin used in the present invention, although not specifically defined, is preferably in the range of 200,000 to 300,000, and its melt flow rate is preferably 0.5 to 30 g/10 min, more preferably 0.5 to 10 g/10 min, even more preferably 0.5 to 4 g/10 min. If the melt flow rate of the resin is less than 0.5 g/10 min, the resin can not stand use under the standard molding conditions, for example, at a molding temperature of 200 to 280° C., while if the melt flow rate of the resin exceeds 30 g/10 min, satisfactory detersive effect can hardly be obtained. The values of melt flow rate shown in the present specification are those determined under the conditions of 220° C. and 10 kg.

In the present invention, water in the composition serves for inducing foaming at the ordinary molding temperature (such as 160 to 350° C.) to elevate the internal pressure of the molding machine, which contributes to enhancing detergency of the composition.

The water content of the composition is preferably 0.2 to 10 parts by weight per 100 parts by weight of the detergent as this range of water content can provide the desired cleaning effect. If no water is contained in the composition, since no foaming by water occurs in the molding machine, the internal pressure of the molding machine remains low and no satisfactory deterging effect can be obtained.

When water is contained in the composition, such water is preferably adsorbed on the resin in the composition by making use of its hygroscopicity or confined in the resin by using a porous resin so that water will not be released to the outside when the detergent is used. In a case where water is simply sprinkled around the detergent to let water merely adhere to its surface, water tends to be released and is caused to deposit or amass in or immediately below the hopper of the molding machine, so that when the next charge of molding material is supplied to the molding machine, such water wets the molding material to give adverse effect to the molding operation. It is necessary, therefore, to remove such water by drying or wiping.

In a case where the detergent of the present invention is used in a vented molding machine, it is desirable to supply part of the detergent from the vent hole, too.

The type of wollastonite used in this invention is not specified, but it is preferable to use the one having an average fiber length of 1,000 μm or less, preferably 500 μm or less, an average fiber diameter of 2 to 40 μm, preferably 5 to 20 μm, and an aspect ratio (ratio of average fiber length to average fiber diameter) of 1 to 50, preferably 5 to 20, as the above-defined wollastonite can provide the best deterging effect and can also minimize abrasion wear of the interior of the molding machine or clogging of its filter portion. It is also possible to use wollastonite which has been subjected to a surface treatment such as silane treatment. Among the preferred examples of wollastonite for use in this invention, which are commercially available, are NYGLOS20 (average fiber length: 260 μm; average fiber diameter: 20 μm; aspect ratio: 13), NYGLOS4 (average fiber length: 40 μm; average fiber diameter: 3.6 μm; aspect ratio: 11) and NYAD325 (average fiber length: 50 μm; average fiber diameter: 10 μm; aspect ratio: 5) produced by NYCO Minerals Inc., and ORLEANS290 (aspect ratio: 10) produced by Orleans Resources Inc.

The wollastonite content of the composition is preferably in the range of 5 to 100 parts by weight, more preferably 10 to 70 parts by weight, per 100 parts by weight of the thermoplastic resin for obtaining the maximal cleaning effect.

The effect of incorporation of wollastonite cannot be obtained by the addition of other similar inorganic fibers or powders such as glass fiber, mica and calcium silicate. This is evident from a comparison of Example 6 with Comparative Examples 4 to 6.

The detergent composition of the present invention preferably contains a thermoplastic ultra-high-molecular-weight polymer as it serves for providing even higher detergency, especially at high temperatures. The "thermoplastic ultra-high-molecular-weight polymers" mentioned in the present specification refer to the polymers having a molecular weight of 1,000,000 or more, which include, for example, ethylene-based ultra-high-molecular-weight polymers, styrene-acrylonitrile-based ultra-high-molecular-weight polymers, and methyl methacrylate-based ultra-high-molecular-weight polymers. The upper limit of the molecular weight of these polymers is not specifically defined, but generally it is desirable that the molecular weight does not exceed 10,000,000. These ultra-high-molecular-weight polymers may be homopolymers or copolymers. In case of copolymers, it is necessary that the content of the main component, for example, ethylene, styrene-acrylonitirle copolymer or methyl methacrylate, is not less than 50% by weight.

In a case where a thermoplastic ultra-high-molecular-weight polymer is contained in the composition, the preferred examples of the resin/polymer combination are: ethylene-based resin/ethylene-based ultra-high-molecular-weight polymer, propylene-based resin/ethylene-based ultra-high-molecular-weight polymer, styrene-acrylonitirle-based resin/ethylene-based ultra-high-molecular-weight polymer, styrene-acrylonitrile-based resin/styrene-acrylonitirle-based ultra-high-molecular-weight polymer, styrene-acrylonitrile-based resin/methyl methacrylate-based ultra-high-molecular-weight polymer, methyl methacrylate-based resin/methyl methacrylate-based ultra-high-molecular-weight polymer, and methyl methacrylate-based resin/styrene-acrylonitrile-based ultra-high-molecular-weight polymer. The especially preferred combinations are ethylene-based resin/ethylene-based ultra-high-molecular-weight polymer, propylene-based resin/ethylene-based ultra-high-molecular-weight polymer, and styrene-acrylonitrile-based resin/ethylene-based ultra-high-molecular-weight polymer.

The content of the thermoplastic ultra-high-molecular-weight polymer is preferably 2 to 50 parts by weight, more preferably 5 to 40 parts by weight, even more preferably 10 to 30 parts by weight, per 100 parts by weight of the thermoplastic resin.

In a case where a thermoplastic ultra-high-molecular-weight polymer is contained in the detergent composition of the present invention, it is more preferable to concurrently add a styrene-based saturated thermoplastic elastomer.

As described above, by containing a thermoplastic ultra-high-molecular-weight polymer in the composition, it is possible to enhance detergency of the composition, particularly at high temperatures, and by further containing a styrene-based saturated thermoplastic elastomer, compatibility between the thermoplastic resin and the thermoplastic ultra-high-molecular-weight polymer can be improved, which contributes to preventing powdering of the thermoplastic ultra-high-molecular-weight polymer.

The "styrene-based saturated thermoplastic elastomer" referred to herein means a polymer obtained by hydrogenating a styrene-conjugated diene copolymer to saturate the double bonds in the backbone. It may be either a block copolymer or a random copolymer, but the block copolymer is preferred. The styrene content should be not less than 50% by weight, preferably 50 to 80% by weight, and the rate of hydrogenation is preferably 80 to 100%.

The type of the styrene-based saturated thermoplastic elastomer used in this invention is not specified. It is possible to use the hydrogenated products of styrene-butadiene block copolymer, styrene-butene-ethylene block copolymer and the like, for example, TUFTEC (trade name, produced by Asahi Chemical Industry Co., Ltd.). In a case where an ethylene-based thermoplastic ultra-high-molecular-weight polymer is used, it is preferable to select an elastomer containing ethylene in the soft segment.

The content of the styrene-based saturated thermoplastic elastomer in the composition is preferably 0.2 to 10 parts by weight, more preferably 0.5 to 6 parts by weight, per 100 parts by weight of the thermoplastic resin. When the elastomer content is not more than 10 parts by weight, there is no possibility for the elastomer itself to remain in the molding machine after the molding operation, and when the elastomer content is not less than 0.2 part by weight, powdering of the thermoplastic ultra-high-molecular-weight polymer can well be prevented.

Also, the content of the styrene-based saturated thermoplastic elastomer is preferably 10 to 20% by weight based on the thermoplastic ultra-high-molecular-weight polymer.

A preferred combination of thermoplastic resin, thermoplastic ultra-high-molecular-weight polymer and styrene-based saturated thermoplastic elastomer is the combination of a styrene-based resin, especially styrene-acrylonitrile-based resin, an ethylene-based ultra-high-molecular-weight polymer and a hydrogenated product of styrene-butene-ethylene block copolymer.

It is also preferable to contain grafted silicone in the composition as this material serves for further facilitating displacement of the residual detergent.

"Grafted silicone" is a silicone grafted to a base resin. It is less likely to part from the thermoplastic resin in the molding machine in comparison with the single form of silicone, for example, silicone oil. Consequently, there is no possibility for the silicone to remain in the molding machine after the molding operation, eliminating the risk of silicone being mixed in the thermoplastic resin supplied after the cleaning work or causing deterioration of coatability.

The type of the grafted silicone used in this invention is not specified, but for obtaining satisfactory detergency and easy displaceability of the detergent, it is preferable that the base resin is a polypropylene-based or acrylonitrile-styrene-based resin, and that the silicone content is 30 to 80% by weight based on the base resin. Also, said silicone is preferably used in the form of pellets because of ease of handling. Preferred examples of grafted silicones for use in the present invention, which are commercially available, include BY27-201C (trade name, produced by Toray Dow Corning Silicone Co., Ltd.) using polypropylene as base resin and having a silicone content of 40% by weight, and X-22-2101 (trade name, produced by Shin-Etsu Chemical Co., Ltd.) using polypropylene as base resin and having a silicone content of 50% by weight.

The grafted silicone content of the composition is preferably 0.2 to 10 parts by weight, more preferably 0.5 to 5 parts by weight per 100 parts by weight of the thermoplastic resin. When the silicone content is not less than 0.2 parts by weight, satisfactory detergency and easy displaceability can be obtained, and when the silicone content is not more than 10 parts by weight, no silicone is allowed to remain in the molding machine after the molding work, hence no risk of giving adverse effect to the thermoplastic resin supplied to the molding machine after cleaned.

The detergent composition of the present invention is preferably melt kneaded and formed into pellets by an extruder or other means because the pellets can provide the highest cleaning effect.

As for the size of the pellets, their diameter (mean value of major diameter and minor diameter) is 40 to 100%, preferably 60 to 100% of the screw channel depth of the feed zone, and their length is 40 to 100%, preferably 60 to 100% of the same. The pellets of the above size can maximize the deterging effect and displaceability in the feed zone and are suited for use in a large-sized molding machine, specifically a molding machine having a screw diameter of 70 mm or more and a feed zone screw channel depth of 10 mm or more. When the pellet diameter and length are both not less than 40% (of the screw channel depth), a sufficient detergency and easy displaceability can be obtained, and when the pellet diameter and length are both not more than 100%, there takes place no deficiency of bite into the screw, eliminating the risk of damaging the interior of the cylinder.

The content of the pellets of the above-defined size is preferably 50 to 100% by weight, more preferably 70 to 100% by weight based on the total amount of the pellets. When the above content is not less than 50% by weight, it is possible to obtain the desired detergency and displaceability.

With the detergent composition of the present invention, it is possible to further improve its displaceability by containing therein as a compatibilizing agent a graft polymer consisting of a backbone olefin-based polymer and a side-chain styrene-based polymer.

The "backbone olefin-based polymer" in said graft polymer is polyethylene, polypropylene, ethylene-propylene copolymer or a copolymer in which the ethylene and/or propylene content is 50% by weight or more. In the case of a copolymer in which the ethylene and/or propylene content is 50% by weight or more, there can be used as other monomer to be copolymerized, for example, vinyl acetate, acrylonitrile, glycidyl methacrylate, ethyl acrylate, styrene and the like. As the backbone olefin-based polymer, polyethylene, polypropylene or ethylene-propylene copolymer is preferred.

The "side-chain styrene-based polymer" refers to polystyrene or a copolymer of styrene and one or more of other monomers, in which the styrene content is 50% by weight or more. Typical examples of the other monomers to be copolymerized with styrene are acrylonitrile and methyl methacrylate. Styrene-acrylonitrile copolymer is preferably used as the side-chain styrene-based polymer.

As for the compositional ratios of said backbone olefin-based polymer and side-chain styrene-based polymer, usually the ratio of the olefin-based polymer is 15 to 90% by weight (the styrene-based polymer being 85 to 10% by weight), preferably 20 to 80% by weight (the styrene-based polymer being 80 to 20% by weight), more preferably 40 to 60% by weight (the styrene-based polymer being 60 to 40% by weight).

The ratio of the graft polymer in the composition is preferably 2 to 160 parts by weight, more preferably 2 to 100 parts by weight, most preferably 5 to 80 parts by weight, per 100 parts by weight of the thermoplastic resin.

The graft polymers usable in the present invention can be easily produced from the known graft polymer producing processes, and the graft polymers produced from any of these processes can be used.

A process for producing a graft polymer is illustrated below, but the following process is only an exemplification of the way of producing the graft polymers usable in the present invention.

First, a graft active point is formed in the backbone (or side-chain) polymer by a suitable method such as peroxide treatment, ultraviolet irradiation, high-energy irradiation, copolymerization with a peroxide monomer (a monomer having a polymerizable double bond and an active peroxide in the molecule), heating in the air, etc. Then the backbone (or side-chain) polymer having said graft active point formed therein is contacted with a side-chain (or backbone) polymer, a copolymer, a monomer or a monomeric mixed solution under the necessary conditions to produce a graft polymer. More specifically, for instance, a monomeric mixture of styrene and acrylonitrile is added to a polypropylene powder irradiated with γ-rays in the air, and the mixture is polymerized under heating and then extracted with methanol to get rid of the unreacted monomer to thereby produce a graft polymer. Alternatively, a polypropylene powder is impregnated with a mixed monomer solution composed of styrene, acrylonitrile, t-butylperoxymethacryloyloxyethyl carbonate (peroxide monomer), ethyl carbonate and benzoyl peroxide (polymerization catalyst), carrying out impregnation polymerization at 50 to 100° C. for about 10 hours, and after removing the unreacted monomers, melt kneading and grafting are conducted by a plastomill to produce a graft polymer.

In the detergent composition of the present invention, it is preferable to add an alkaline metal salt, especially a stearic acid metal salt such as magnesium stearate as lubricant. Addition of an alkaline metal salt serves for reducing the tendency of the detergent to remain in the molding machine after the molding work, and makes it easier to remove the detergent should it be allowed to remain. Such an alkaline metal salt is added in an amount of preferably 0.1 to 10 parts by weight per 100 parts by weight of the resin in the detergent. Said alkaline metal salt may be beforehand added to the resin used for the detergent composition or may be added separately at the time of use of the composition, but it is preferable to knead said salt in the resin used for the detergent because of greater effect of addition.

In the detergent composition of the present invention is preferably contained a blowing agent as it contributes to the improvement of detersive effect. The blowing agent used in the present invention may be either an inorganic blowing agent such as sodium bicarbonate, ammonium carbonate, etc., or an organic blowing agent such as azodicarbonamide, azobisisobutyronitrile, etc. The amount of the blowing agent to be added is preferably 0.1 to 4 parts by weight per 100 parts by weight of the detergent composition. The agent is preferably added together with said alkaline metal salt.

The blowing agent may be beforehand kneaded in the resin of the detergent composition or may be separately added at the time of use of the composition, but it is preferably kneaded in the detergent resin because of greater effect of addition.

Glass fiber and inorganic powder may also be contained in the detergent composition of the present invention. As the inorganic powder, for example, glass particles, zeolite and the like can be used. Glass particles are a particulate matter mainly composed of glass of 10 to 200 $\mu$m in average particle size, such as glass powder, glass bead and SHIRASU-balloons (a balloon made of volcanic ash). Glass fiber and inorganic powder are preferably incorporated in the detergent resin so that they will not adhere or remain in or immediately below the hopper of the molding machine when fed. The amount of glass fiber blended is preferably 5 to 100 parts by weight per 100 parts by weight of the detergent resin, and the amount of inorganic powder blended is preferably 5 to 120 parts by weight per 100 parts by weight of the detergent resin.

In use of the detergent composition of the present invention, it is supplied into a molding machine to be cleaned and the molding machine is operated under the same conditions as used for ordinary resin molding, allowing the detergent composition to perform its normal cleaning work. The present detergent composition is especially useful for the injection molding machines and extrusion molding machines, but it can as well be applied widely to the apparatuses having a cylinder portion where a resin is similarly melted and kneaded under heating.

The molding machine into which the detergent composition of the present invention has been supplied for the purpose of cleaning is preferably operated by setting the operating conditions that will raise the internal pressure of the cylinder. That is, it is preferable to conduct such operations as lowering the cylinder temperature within limits that allow discharge, applying a back pressure, and performing injection at high speed.

The present invention is further illustrated by the following Examples and Comparative Examples.

The molding machine, the molding temperatures 15 and the measuring conditions used in the Examples and Comparative Examples are shown below.

(1) Molding Machine

An in-line screw type injection molding machine (clamping force: 125 tons; capacity: 10 ounces) was used.

(2) Molding Temperature

The molding temperatures used in the respective Examples and Comparative Examples are shown in Table 1.

(3) Melt Flow Rate

Determined according to JIS-K7210.

(4) Acrylonitrile Content (AN%)

Determined by an infrared spectrophotometer.

(5) Water Content

Determined from the weight loss on heating at 105° C. for 2 hours using a circulating hot air dryer.

(6) Measurement of Powder Fineness

The detergent was passed through a 16-mesh screen (screen shaker) and the weight of the powder which passed through the screen was measured to obtain a ratio by weight before and after passing through the screen.

EXAMPLE 1

A black colored molding material of styrene-butadiene-acrylonitrile copolymer (ABS) was charged into a molding machine and then discharged out by an injecting operation to empty the molding machine. Then a detergent composition of the present invention, which had been prepared by mixing and kneading 100 parts by weight of a styrene-acrylonitrile copolymer (AS) having a melt flow rate of 2 g/10 min and an AN content of 34% by weight and 25 parts by weight of wollastonite (trade name NYGROS20 produced by NYCO Minerals Inc.) having an average fiber length of 260 μm, an average fiber diameter of 20 μm and an aspect ratio of 13 and leaving the mixture in a room for 3 days to let it have a water content of 0.5% by weight, was supplied into the molding machine and the 1st round of injecting operation (cleaning injection) was conducted. The weight of the detergent composition lost and the time required till the influence of the ABS resin black colored molding material became nil were measured.

After discharging the detergent composition, the 2nd round of injecting operation (injection for displacement of the residual detergent) was conducted with a colorless molding material comprising ABS for ordinary molding, and the time required till it was confirmed that there was no longer influence (formation of black spots) of the residual detergent, and the amount of the ABS colorless molding material used were measured.

The results are shown in Table 1.

COMPARATIVE EXAMPLE 1

Measurements were made according to the same procedure as Example 1 except that instead of using the detergent composition of the present invention, AS same as used in Example 1 was dried and supplied into the molding machine. The results are shown in Table 1.

EXAMPLE 2

Measurements were made according to the same procedure as Example 1 except that the amount of wollastonite blended was reduced to 5 parts by weight. The results are shown in Table 1.

EXAMPLE 3

Measurements were made according to the same procedure as Example 1 except that the amount of wollastonite was increased to 50 parts by weight. The results are shown in Table 1.

EXAMPLE 4

Measurements were made according to the same procedure as Example 1 except that the object to be cleaned away was a black colored molding material of a polycarbonate (PC), and that after discharge of the detergent composition, the 2nd round of injecting operation was carried out with a colorless molding material comprising PC for ordinary molding. The results are shown in Table 1.

COMPARATIVE EXAMPLE 2

Measurements were made according to the same procedure as Example 4 except that instead of using the detergent composition of the present invention, a kneaded mixture of 100 parts by weight of AS same as used in Example 1 and 25 parts by weight of glass fiber was dried and charged into the molding machine. The results are shown in Table 1.

EXAMPLE 5

A black colored molding material of polypropylene (PP) was filled in the molding machine and then discharged by injection to empty the molding machine. Then a detergent composition of the present invention, which had been prepared by kneading a premix of 100 parts by weight of PP having a melt flow rate of 5 g/10 min and 25 parts by weight of wollastonite same as used in Example 1 by supplying a predetermined amount of water from a pump, was charged into the molding machine and the 1st round of injection operation (cleaning injection) was conducted. The weight of the detergent composition lost and the time required till the influence of the PP resin black colored molding material disappeared were measured.

After discharging the detergent composition, the 2nd round of injection operation (injection for displacement of residual detergent) was conducted with a colorless molding material comprising PP for ordinary molding, and the time required till no influence (formation of black spots) of the residue was confirmed and the amount of the PP colorless molding material used were measured. The results are shown in Table 1.

COMPARATIVE EXAMPLE 3

Measurements were made according to the same procedure as Example 4 except that instead of using the detergent composition of the present invention, a kneaded mixture of 100 parts by weight of PP same as used in Example 5 and 25 parts by weight of glass beads was dried and charged into the molding machine. The results are shown in Table 1.

EXAMPLE 6

Measurements were made according to the same procedure as Example 1 except that the object to be cleaned away was a black colored molding material of polyphenylene oxide (PPO), that a detergent composition of the present invention produced by kneading 100 parts by weight of AS same as used in Example 1 and 25 parts by weight of wollastonite same as used in Example 1 and leaving the mixture in a room for 3 days to let it have a water content of 0.5% by weight was charged into the molding machine, and that after discharging the detergent composition, the 2nd round of injecting operation was conducted with a colorless molding material of high impact polystyrene (HIPS) for ordinary molding. The results are shown in Table 1.

COMPARATIVE EXAMPLE 4

Measurements were made according to the same procedure as Example 6 except that a kneaded mixture of 100 parts by weight of AS same as used in Example 1 and 25 parts by weight of diatomaceous earth (trade name Celite #231 produced by Tokyo Keisodo Kogyo KK) was used in place of the detergent composition of the present invention. The results are shown in Table 1.

COMPARATIVE EXAMPLE 5

Measurements were made according to the same procedure as Comparative Example 4 except that 25 parts by weight of mica of Chinese product (particle size: 100 mesh or under) was used in place of 25 parts by weight of diatomaceous earth. The results are shown in Table 1.

COMPARATIVE EXAMPLE 6

Measurements were made according to the same procedure as Comparative Example 4 except that 25 parts by weight of calcium silicate (first class grade chemical, produced by Kanto Chemical Co., Ltd.) was used in place of 25 parts by weight of diatomaceous earth. The results are shown in Table 1.

EXAMPLE 7

Measurements were made according to the same procedure as Example 4 except that a detergent composition of the present invention, produced by kneading a premix of 100 parts by weight of PP same as used in Example 5, 12 parts by weight of wollastonite same as used in Example 1 and 5 parts by weight of a graft polymer having polypropylene (PP) as backbone and AS as side chain (PP: 50 wt %; AS: 50 wt %) by supplying a predetermined amount of water from a pump was charged into the molding machine. The results are shown in Table 1.

COMPARATIVE EXAMPLE 7

Measurements were made according to the same procedure as Example 5 except that instead of using the detergent composition of the present invention, a kneaded mixture of 100 parts by weight of PP same as used in Example 5 and 25 parts by weight of glass fiber was charged into the molding machine. The results are shown in Table 1.

EXAMPLE 8

A black colored molding material of polyphenylene oxide (PPO) was filled in the molding machine and then discharged by an injecting operation to empty the molding machine. Then a detergent composition of the present invention, which had been produced by kneading a mixture of 100 parts by weight of AS having a melt flow rate of 1 g/10 min and an AN content of 24% by weight, 15 parts by weight of wollastonite same as used in Example 1, 5 parts by weight of the same graft polymer as used in Example 7 and 15 parts by weight of a polyethylene (PE)-based ultra-high-molecular-weight polymer having a molecular weight of 4,500,000 (trade name SUNFINE UH950 produced by Asahi Chemical Industry Co., Ltd.) and leaving the kneaded mixture in a room for 3 days to let it have a water content of 0.3% by weight, was charged into the molding machine and the 1st round of injecting operation (cleaning injection) was conducted. The eight of the detergent lost and the time required till the influence of the PPO resin black colored molding material disappeared were measured.

After discharging the detergent composition, the 2nd round of injecting operation (displacement injection) was carried out with a colorless molding material of polyoxymethylene (POM) for ordinary molding, and the time required till no influence (formation of black spots) of the residual detergent was confirmed and the amount of the POM colorless molding material used were measured. The results are shown in Table 1.

COMPARATIVE EXAMPLE 8

Measurements were made according to the same procedure as Example 8 except that instead of using the detergent composition of the present invention, a kneaded mixture of 100 parts by weight of AS same as used in Example 1 and 25 parts by weight of glass fiber was dried and charged into the molding machine. The results are shown in Table 1.

EXAMPLE 9

Measurements were made according to the same procedure as Example 1 except that the objective resin to be cleaned away was a black colored molding material of polyoxymethylene (POM), that a detergent composition of the present invention produced by kneading a mixture of 100 parts by weight of AS same as used in Example 1 and 30 parts by weight of wollastonite (NYAD325 produded by NYCO Minerals Inc.) having an average fiber length of 50 $\mu$m, a fiber diameter of 10 $\mu$m and an aspect ratio of 5 and leaving the kneaded mixture in a room for 3 days to let it have a water content of 0.5% by weight was charged into the molding machine, and that after discharging the detergent composition, the 2nd round of injecting operation was conducted with a colorless molding material of POM for ordinary molding. The results are shown in Table 1.

EXAMPLE 10

The same measurement procedure as in Example 9 was conducted except for use of wollastonite having an average fiber length of 40 $\mu$m, a fiber diameter of 3.6 $\mu$n and an aspect ratio of 11 (NYGROS4 produced by NYCO Minerals Inc.). The results are shown in Table 1.

EXAMPLE 11

A detergent composition of the present invention was produced by kneading a mixture of 100 parts by weight of AS having a melt flow rate of 2 g/10 20 min and an AN content of 34% by weight, 5 parts by weight of a graft polymer having polypropylene (PP) as backbone and AS as side chain (PP: 50 wt %; AS: 50 wt %), 15 parts by weight of a PE-based ultra-high-molecular-weight polymer same as used in Example 8, 2 parts by weight of a styrene-based saturated thermoplastic elasomter (styrene: 67 wt %; ethylene-butene: 33 wt % (TUFTEC H1043 produced by Asahi Chemical Industry Co., Ltd.)) and 15 parts by weight of wollastonite same as used in Example 1, and leaving the kneaded mixture in a room for 3 days to let it have a water content of 0.5% by weight. The result of powder fineness measurement of the composition was 200 ppm.

A black colored molding material of polyphenylene oxide (PPO) was filled in the molding machine and then discharged by an injecting operation to empty the molding machine. Then the said detergent composition was supplied into the molding machine and the 1st round of injecting operation (cleaning injection) was conducted. The weight of the detergent composition lost and the time required till the influence of the PPO black colored molding material disappeared were measured.

After discharging the detergent composition, the 2nd round of injecting operation (displacing injection) was carried out with a colorless molding material of polyoxymethylene (POM) for ordinary molding, and the time taken till no influence (formation of black spots) of the residual detergent was confirmed and the amount of the POM colorless molding material used were measured. The results are shown in Table 1.

EXAMPLE 12

A detergent composition was produced by kneading a premix of 100 parts by weight of polystyrene (PS) having a melt flow rate of 8 g/10 min, 15 parts by weight of a PE-based ultra-high-molecular-weight polymer same as used in Example 11, 2 parts by weight of a styrene-based saturated thermoplastic elastomer same as used in Example 11, 5 parts by weight of a graft polymer having PP as backbone and PS as side chain (PP: 50 wt %; PS: 50 wt %) and 10 parts by weight of wollastonite same as used in Example 1 by supplying a predetermined amount of water from a pump. The result of powder fineness measurement of the composition was 100 ppm.

Using this detergent composition, measurements were made in the same way as in Example 11 except that the object to be cleaned away was a black colored molding material of polyphenylene oxide (PPO), and that after discharging the detergent composition, the 2nd round of injecting operation was conducted with a colorless molding material of ABS for ordinary molding. The results are shown in Table 1.

EXAMPLE 13

A black colored molding material of styrene-butadiene-acrylonitrile copolymer (ABS) was filled in the molding machine and then discharged by an injecting operation to empty the molding machine. Then a detergent composition of the present invention produced by kneading a mixture of 100 parts by weight of styrene-acrylonitrile copolymer (AS) having a melt flow rate of 2 g/10 min and an AN content of 34% by weight and 2.0 parts by weight of grafted silicone using polypropylene as base resin and having a silicone content of 40% by weight (BY27-201C produced by Toray Dow Corning Silicone Co., Ltd.) and leaving the kneaded mixture in a room for 3 days to let it have a water content of 0.5% by weight was supplied into the molding machine and the 1st round of injecting operation (cleaning injection) was conducted. The weight of the detergent used and the time required till the influence of the ABS resin black colored molding material disappeared were measured.

After discharging the detergent composition, the 2nd round of injecting operation (displacement injection) was conducted with a colorless molding material of ABS for ordinary molding, and the amount of the ABS colorless molding material used and the time required till no influence (formation of black spots) of the residual detergent was confirmed were measured.

The results are shown in Table 1.

TABLE 1

| | Before cleaning | | | Injecting operation for cleaning (A) Detergent | | | | | Additive Wollastonite | | Additive glass | |
|---|---|---|---|---|---|---|---|---|---|---|---|---|
| | Molding temperature (° C.) | Resin before cleaning | | Base | | | | | | | | |
| | | Type | Color | Type | AN % | Melt flow rate | Water content | Parts by weight | Type | Parts by weight | Type | Parts by weight |
| Ex. 1 | 240 | ABS | Black | AS | 34 | 2 | 0.5 | 100 | Diameter 20μ | 25 | — | — |
| Comp. Ex. 1 | " | " | " | " | " | " | 0 | " | — | — | — | — |
| Ex. 2 | " | " | " | " | " | " | 0.5 | " | Diameter 20μ | 5 | — | — |
| Ex. 3 | " | " | " | " | " | " | 0.5 | " | Diameter 20μ | 50 | — | — |
| Ex. 4 | 310 | PC | Black | AS | 34 | 2 | 0.5 | 100 | Diameter 20μ | 25 | — | — |
| Comp. Ex. 2 | " | " | " | " | " | " | 0 | " | — | — | Fiber | 25 |
| Ex. 5 | 210 | PP | Black | PP | — | 5 | 0.5 | 100 | Diameter 20μ | 25 | — | — |
| Comp. Ex. 3 | " | " | " | " | — | " | 0 | " | — | — | Bead | 25 |
| Ex. 6 | 280 | PPO | Black | AS | 34 | 2 | 0.5 | 100 | Diameter 20μ | 25 | — | — |
| Comp. Ex. 4 | " | " | " | " | " | " | 0.5 | " | — | — | — | — |
| Comp. Ex. 5 | " | " | " | " | " | " | 0.5 | " | — | — | — | — |
| Comp. Ex. 6 | 280 | PPO | Black | AS | 34 | 2 | 0.5 | 100 | — | — | — | — |
| Ex. 7 | 210 | PP | Black | PP | — | 5 | 0.4 | 100 | Diameter 20μ | 12 | — | — |
| Comp. Ex. 7 | " | " | " | " | — | " | 0 | " | — | — | Fiber | 25 |
| Ex. 8 | 280 | PPO | Black | AS | 24 | 1 | 0.3 | 100 | Diameter 20μ | 15 | — | — |
| Comp. Ex. 8 | " | " | " | " | 34 | 2 | 0 | " | — | — | Fiber | 25 |
| Ex. 9 | 200 | POM | Black | AS | 34 | 2 | 0.5 | 100 | Diameter 10μ | 30 | — | — |
| Ex. 10 | " | " | " | Black | " | " | " | 0.5 | " | Diameter 3.6μ | 30 | — | — |
| Ex. 11 | 280 | PPO | Black | AS | 34 | 2 | 0.5 | 100 | Diameter 20μ | 15 | — | — |
| Ex. 12 | " | " | " | Black | PS | — | 8 | 0.4 | " | Diameter 20μ | 10 | — | — |
| Ex. 13 | 240 | ABS | Black | AS | 34 | 2 | 0.5 | 100 | — | — | — | — |

TABLE 1-continued

| | Injecting operation for cleaning (A) | | | | | | | | Injecting operation for displacement (B) | | | | Results (A + B) | |
|---|---|---|---|---|---|---|---|---|---|---|---|---|---|---|
| | Detergent | | | | | | | | | | | | Total amount | |
| | Additive inorganic matter | | Additive graft polymer | | Additive ultra-high-molecular | | Amount used (kg) | Time required (kg) | Resin used | | Amount used (kg) | Time required (min) | of resin, etc., used (kg) | Total time required (min) |
| | Type | Parts by weight | Type | Parts by weight | weight PE Parts by weight | Other Additive Parts by weight | | | Type | Color | | | | |
| Ex. 1 | — | — | — | — | — | — | 1.0 | 4 | ABS | Colorless | 1.0 | 4 | 2.0 | 8 |
| Comp. Ex. 1 | — | — | — | — | — | — | 3.0 | 10 | " | " | 1.0 | 4 | 4.0 | 14 |
| Ex. 2 | — | — | — | — | — | — | 1.8 | 5 | " | " | 1.0 | 4 | 2.8 | 9 |
| Ex. 3 | — | — | — | — | — | — | 0.8 | 3 | " | " | 2.0 | 6 | 2.8 | 9 |
| Ex. 4 | — | — | — | — | — | — | 1.5 | 5 | PC | Colorless | 2.0 | 6 | 3.5 | 11 |
| Comp. Ex. 2 | — | — | — | — | — | — | 2.0 | 6 | " | " | 2.7 | 8 | 4.7 | 14 |
| Ex. 5 | — | — | — | — | — | — | 2.0 | 6 | PP | Colorless | 1.0 | 4 | 3.0 | 10 |
| Comp. Ex. 3 | — | — | — | — | — | — | 3.0 | 9 | " | " | 1.5 | 5 | 4.5 | 14 |
| Ex. 6 | — | — | — | — | — | — | 1.8 | 5 | HIPS | Colorless | 1.0 | 4 | 2.8 | 9 |
| Comp. Ex. 4 | Diatomaceous earth | 25 | — | — | — | — | 3.0 | 10 | " | " | 2.5 | 7 | 5.5 | 17 |
| Comp. Ex. 5 | Mica | 25 | — | — | — | — | 2.5 | 9 | " | " | 2.5 | 7 | 5.0 | 16 |
| Comp. Ex. 6 | Calcium silicate | 25 | — | — | — | — | 2.5 | 9 | HIPS | Colorless | 1.5 | 5 | 4.0 | 14 |
| Ex. 7 | — | — | — | 5 | — | — | 2.3 | 7 | PP | Colorless | 0.7 | 3 | 3.0 | 10 |
| Comp. Ex. 7 | — | — | — | — | — | — | 3.0 | 9 | " | " | 1.5 | 5 | 4.5 | 14 |
| Ex. 8 | — | — | — | 5 | 15 | — | 1.5 | 5 | POM | Colorless | 2.0 | 6 | 3.5 | 11 |
| Comp. Ex. 8 | — | — | — | — | — | — | 2.0 | 6 | " | " | 3.0 | 10 | 5.0 | 16 |
| Ex. 9 | — | — | — | — | — | — | 1.0 | 4 | POM | Colorless | 1.0 | 4 | 2.0 | 8 |
| Ex. 10 | — | — | — | — | — | — | 1.6 | 5 | " | " | 1.0 | 4 | 2.6 | 9 |
| Ex. 11 | — | — | PP-AS | 5 | 15 | Elastomer 2 | 1.6 | 5 | POM | Colorless | 1.2 | 4 | 2.7 | 9 |
| Ex. 12 | — | — | PP-PS | 5 | 15 | Elastomer 2 | 2.5 | 8 | ABS | Colorless | 1.0 | 4 | 3.5 | 12 |
| Ex. 13 | — | — | — | — | — | PP-SI 2 | 1.5 | 5 | " | " | 0.5 | 2 | 2.0 | 7 |

Industrial Applicability

Containing water and wollastonite, the detergent composition of the present invention shows a high detersive effect. Also, as it need contain no glass fiber or glass particles, the composition has no risk of damaging the interior of the molding machine or causing clogging of its filter portion, and further there is no need of worrying about the adverse effect of the composition on the working environment. Moreover, although the composition contains a thermoplastic ultra-high-molecular-weight polymer, such a polymer will not be powdered as the composition also contains a styrene-based saturated thermoplastic elastomer, so that the composition shows high detergency and easy displaceability. Still further, the composition contains a grafted silicone, which contributes to further enhancing detersive effect and displaceability of the composition, so that the composition gives no adverse effect to the molding material after use for cleaning of the molding machine.

What is claimed is:

1. A detergent composition useful for cleaning away a resin remaining in a molding machine after molding, comprising a thermoplastic resin, water and wollastonite.

2. The detergent composition according to claim 1, wherein the content of water is 0.2 to 10 parts by weight per 100 parts by weight of the thermoplastic resin.

3. The detergent composition according to claim 1, wherein the content of wollastonite is 5 to 100 parts by weight per 100 parts by weight of the thermoplastic resin.

4. The detergent composition according to claim 1, wherein the melt flow rate of the thermoplastic resin is 0.5 to 30 g/10 min.

5. The detergent composition according to claim 1, further containing a thermoplastic ultra-high-molecular-weight polymer and optionally a styrene-based saturated thermoplastic elastomer.

6. The detergent composition according to claim 5, wherein a thermoplastic ultra-high-molecular-weight polymer is contained in an amount of 2 to 50 parts by weight and a styrene-based saturated thermoplastic elastomer is contained in an amount of 0.2 to 10 parts by weight, per 100 parts by weight of the thermoplastic resin.

7. The detergent composition according to claim 5, wherein the content of said styrene-based saturated thermoplastic elastomer is 10 to 20% by weight based on the thermoplastic ultra-high-molecular-weight polymer.

8. The detergent composition according to claim 1, wherein the thermoplastic resin is a styrene-based resin.

9. The detergent composition according to claim 1, wherein the thermoplastic resin is a styrene-acrylonitrile copolymer.

10. The detergent composition according to claim 1, further containing a grafted silicone.

11. The detergent composition according to claim 5, further containing a grafted silicone.

12. The detergent composition according to claim 1, further containing a graft polymer comprising an olefin-based polymer as backbone and a styrene-based polymer as side chain.

13. The detergent composition according to claim 5, further containing a graft polymer comprising an olefin-based polymer as backbone and a styrene-based polymer as side chain.

14. A detergent composition effective for cleaning away a resin remaining in a molding machine after molding, comprising a thermoplastic resin and a grafted silicone.

15. A method for cleaning away a resin remaining in a molding machine after molding, which comprises supplying into the molding machine a detergent composition comprising a thermoplastic resin, water and wollastonite.

16. A method for cleaning away a resin remaining in a molding machine after molding, which comprises supplying into the molding machine a detergent composition comprising a thermoplastic resin and a grafted silicone.

* * * * *

UNITED STATES PATENT AND TRADEMARK OFFICE
CERTIFICATE OF CORRECTION

PATENT NO.    : 6,551,411 B1
DATED         : April 22, 2003
INVENTOR(S)   : Ito et al.

It is certified that error appears in the above-identified patent and that said Letters Patent is hereby corrected as shown below:

<u>Title page,</u>
Item [30], Foreign Application Priority Data, delete
"Sep. 1, 1999 (JP)………………….. 11-246940"
"Nov. 22, 1999 (JP) ……………….. 11-331332"

Signed and Sealed this

Twenty-third Day of September, 2003

JAMES E. ROGAN
*Director of the United States Patent and Trademark Office*